J. R. HARE.
BASKET.
No. 176,952. Patented May 2, 1876.
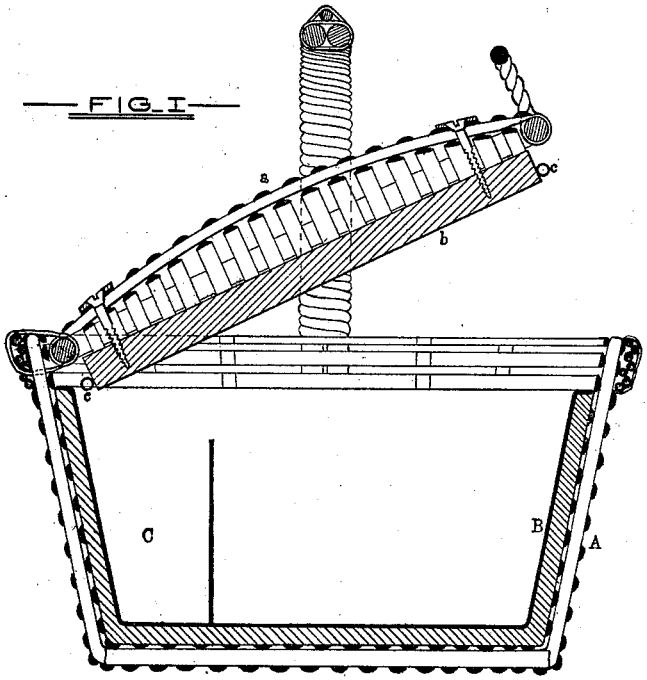
FIG. I.
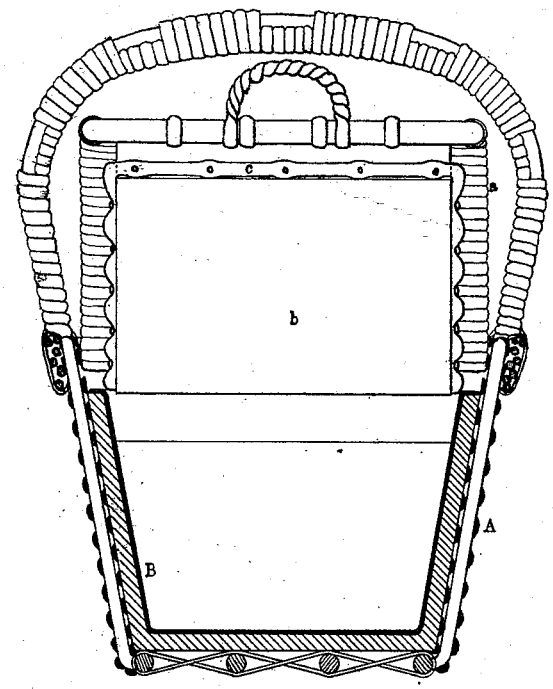
FIG. II.
WITNESSES:
Wm. W. Towson
W. W. Wharton
INVENTOR:
John Rudge Hare,
by G. H. & W. S. Howard,
his Attys.

UNITED STATES PATENT OFFICE.

JOHN R. HARE, OF BALTIMORE, MARYLAND.

IMPROVEMENT IN BASKETS.

Specification forming part of Letters Patent No. 176,952, dated May 2, 1876; application filed March 17, 1876.

*To all whom it may concern:*

Be it known that I, JOHN RUDGE HARE, of the city of Baltimore and State of Maryland, have invented certain new and useful Improvements in Lunch or Market Baskets, of which the following is a specification; and I do hereby declare that in the same is contained a full, clear, and exact description of my said invention, reference being had to the accompanying drawing, and to the letters of reference marked thereon.

My invention relates to a basket intended more particularly for the conveyance of marketing, workmen's dinners, lunches, &c., said basket having an interior food-receptacle, combined with a refrigerating appliance and an air-tight lid, as hereinafter described.

In the further description of my invention which follows, due reference must be had to the accompanying drawing, forming a part of this specification, and in which—

Figure 1 is a longitudinal section of my improved basket with the cover thereof open, and Fig. 2 a transverse section of the same.

Similar letters of reference indicate similar parts in both figures.

A is the wicker-work casing of the basket, provided with handle or handles, in the ordinary manner. The cover $a$ of the basket is hinged to the casing A, to prevent its becoming detached and mislaid. B is a water-tight food-receptacle, preferably made of sheet metal, with a flange at the upper edge thereof, extending to the casing A. The space existing between the food-receptacle B and the wicker-work casing A is packed with cork, paper, or some other light non-conducting material. C is an ice-chamber located at one end of the food-receptacle, in which ice is placed to cool the articles in the basket. The food-receptacle B is closed with a lid, $b$, provided with a flexible gasket, $c$, at the edge thereof, to form an air-tight joint. The lid $b$, for the sake of convenience, is attached to the cover $a$, and is raised with it in opening the basket.

The advantages derived from the use of this invention are apparent. Tainting of articles of food, whether animal or vegetable, is prevented during the summer months. The food-receptacle being tight, no drip of water or juices of meats or fruits can pass from the basket to the clothes of the bearer, while the size, weight, and cost of the basket are but slightly increased.

Having thus described my invention, what I claim as new, and wish to secure by Letters Patent of the United States, is—

As a new article of manufacture, a basket having the food-receptacle B surrounded with some non-conducting material, and provided with the ice-chamber C and air-tight lid $b$, substantially as and for the purpose set forth.

In testimony whereof I have hereunto subscribed my name this 10th day of March, in the year of our Lord 1876.

JOHN R. HARE.

Witnesses:
 WM. H. BAYZAUD,
 C. W. SCHAEFER.